(12) United States Patent
Schuette, Jr. et al.

(10) Patent No.: US 6,223,445 B1
(45) Date of Patent: May 1, 2001

(54) REMODEL BOX INSTALLATION TOOL AND METHOD

(76) Inventors: Walter R. Schuette, Jr.; Terry L. Schuette, both of 2762 S. Vrain St., Denver, CO (US) 80236

( * ) Notice: Subject to any disclaimer, the term of this patent is extended or adjusted under 35 U.S.C. 154(b) by 0 days.

(21) Appl. No.: 09/164,165

(22) Filed: Sep. 30, 1998

(51) Int. Cl.[7] .................................. G01B 1/00; G01B 3/00
(52) U.S. Cl. ......................................... 33/528; 3/DIG. 10
(58) Field of Search ............................... 33/528, DIG. 10

(56) References Cited

U.S. PATENT DOCUMENTS

| | | | |
|---|---|---|---|
| 3,842,510 | * 10/1974 | Elliott | 33/528 |
| 4,228,592 | * 10/1980 | Badger | 33/DIG. 10 |
| 4,793,069 | * 12/1988 | McDowell | 33/528 |
| 5,222,303 | * 6/1993 | Jardine | 33/528 |
| 5,613,811 | * 3/1997 | Tillemans | 33/DIG. 10 |
| 5,706,586 | * 1/1998 | Payne | 33/528 |
| 5,813,130 | * 9/1998 | MacDowell | 33/528 |
| 5,860,219 | * 1/1999 | Wilkinson | 33/DIG. 10 |

\* cited by examiner

Primary Examiner—G. Bradley Bennett
(74) Attorney, Agent, or Firm—Ramon L. Pizarro; Edwin H. Crabtree

(57) ABSTRACT

A device and method for installing and supporting an electrical remodel box from a section of gypsum board, the remodel box being of the type having a rectangular perimeter having a pair of substantially parallel sides spaced apart at a distance "w" and a pair of sides spaced apart at a distance "h". The method involves using the device, which is a template tool which includes a base with a perimeter defined by at least one pair of substantially parallel sides, a level indicator extends between the substantially parallel sides, substantially parallel end sides between the substantially parallel sides, an upper surface and a flat lower surface, the lower surface being substantially flat. The user first locates an area on the gypsum board which is unsupported by a stud, and then places the template tool over the unsupported area. The parallel sides are then aligned the by using the level on the base. Then the user will mark the surface of the gypsum board with lines along the substantially parallel sides of the template tool and along the end sides of the base. An aperture is then cut through the gypsum board along the markings to create the edges of an aperture that is used to support the remodel box. The electrical remodel box is then inserted through the aperture in the gypsum board.

14 Claims, 2 Drawing Sheets

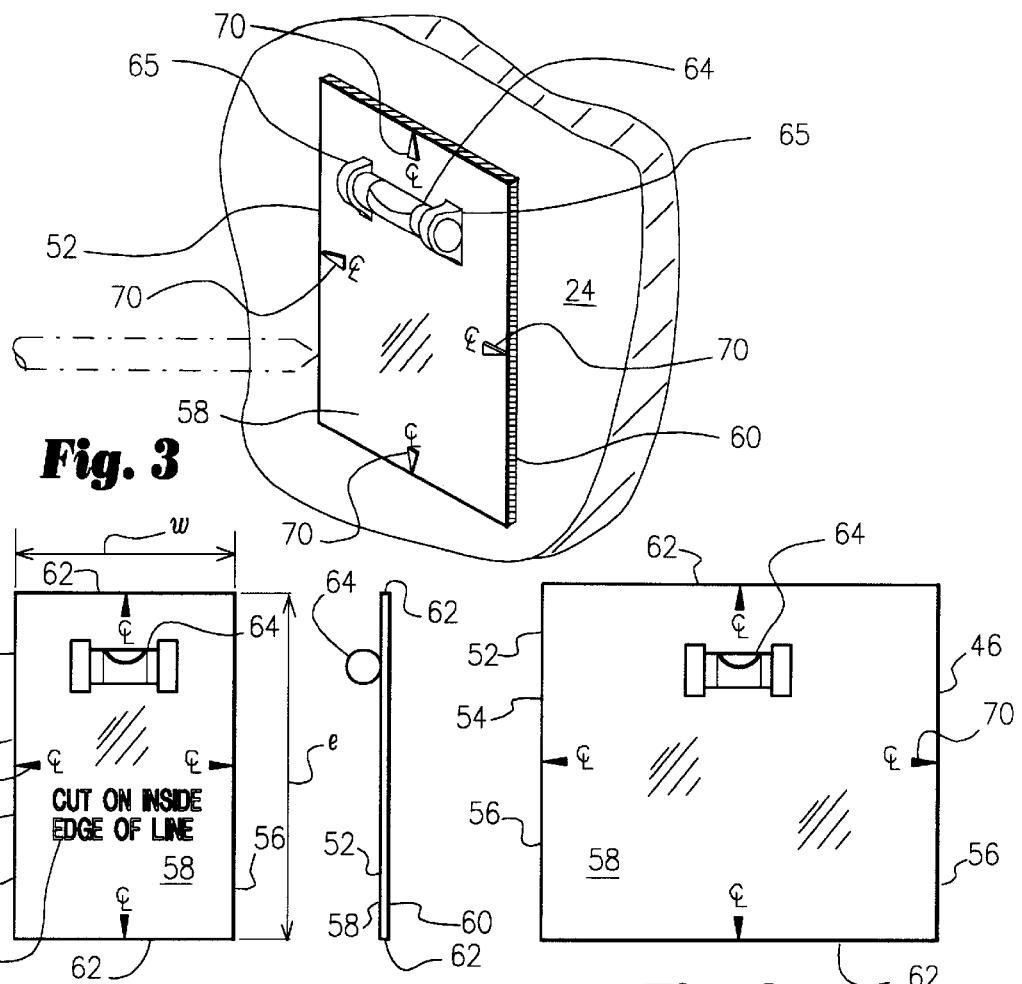
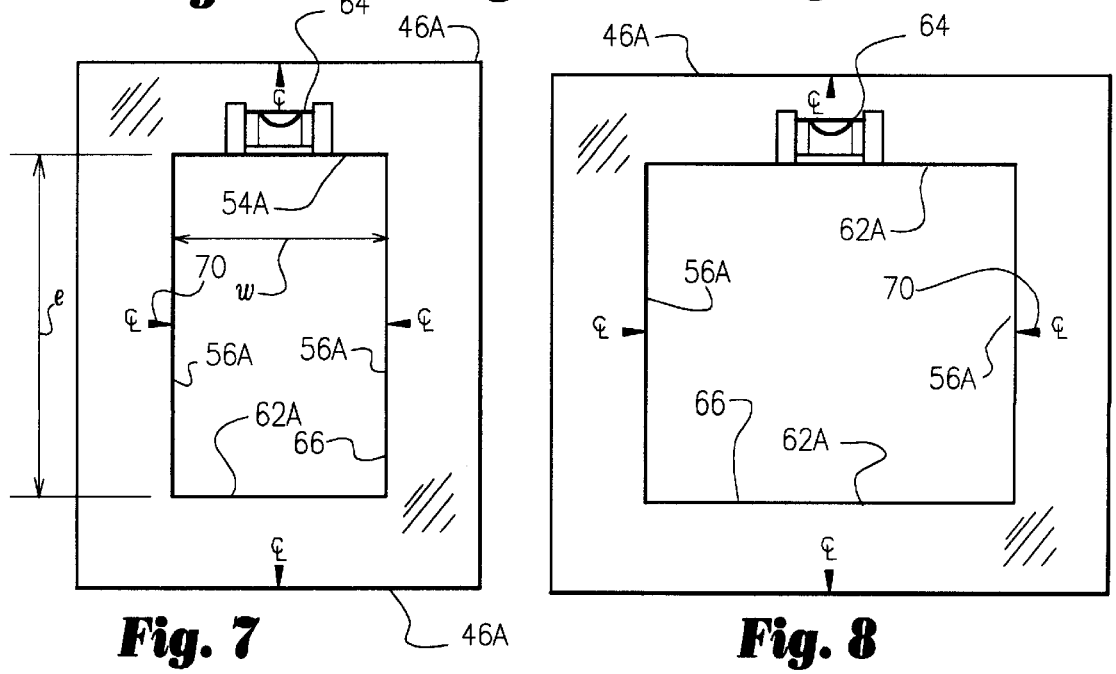

REMODEL BOX INSTALLATION TOOL AND METHOD

BACKGROUND OF THE INVENTION (a) Field of the Invention

This invention generally relates to a tool for placing and marking the position of an electrical outlet box in a section of gypsum board. More specifically, but not by way of limitation, to a device and method in marking the location and support for an electrical remodel box on a gypsum board wall and creating the support aperture in the gypsum board for support of the electrical remodel box.

(b) Discussion of Known Art

Modern residential and commercial construction typically includes interior walls which include electrical outlets, electrical switch plates and the like mounted on these walls. In order to provide a quality appearance to the finished construction it is important to ensure that the electrical outlets, switch plates, and the like are properly positioned on the walls. The position of these outlets and switch plates is typically determined by the position of the electrical box which is covered by the outlet plate or switch plate. It is important, therefore, to ensure that the electrical box history covered by the plate is properly positioned, meaning that the electrical box is properly aligned vertically and horizontally.

There are many devices which are used for ensuring that the electrical box is properly positioned in new construction. These devices typically cooperate with structure that has been laid during construction, such as studs and floors. For example, the device taught in U.S. Pat. No. 5,630,281 to Pledger et al. includes bearing surfaces that have been adapted for placement against a stud, and surfaces for placement against the sole plate, and a protruding section that accepts the electrical box, so that the device and used to hold the electrical box at the proper location relative to the stud, and allow the user to nail or fasten the box to the stud at the proper location.

There are many tools, such as the Pledger device, which aid the user to properly position an electrical box against a stud or other structural member during construction. Often, however, it is necessary to add electrical boxes after the construction has been completed. Electrical boxes for use in applications were the construction has been completed are known as remodel boxes. A remodel box does not attach to a stud or similar structural member, but mounts against the finished gypsum board, and uses the gypsum board as a support for the box.

A remodel box typically includes an open box shaped structure which includes a generally rectangular perimeter with tabs on diagonally opposed corners. Mounted behind the tabs are pivotally mounted legs which are movable from a position where the legs are wholly contained within the perimeter of the box to a second position where the legs extend away from the perimeter to hold the box against the gypsum board by squeezing the gypsum board between the legs and the tabs.

Thus, the position of the remodel box is determined entirely by the attachment or support of the box against the gypsum board. Ideally, the opening in the gypsum board will be of a rectangular shape with sides that produce a tight fit against the perimeter of the remodel box. With a tight fit, the sides of the opening hold the box at the appropriate mounting angle. In other words, the sides of the aperture determine wether the box can tilt in a counter clockwise or clockwise manner, while the tabs and legs keep the box flush with the surface of the gypsum board.

If the aperture in the gypsum board does not produce a tight fit with the perimeter of the remodel box, the box may tilt in a clockwise or counterclockwise direction, producing an unpleasant appearance. Additionally, the area of gypsum board that remains around the opening or aperture for the remodel box serves to hold the remodel box by providing and area which may be gripped by a set of support legs that extend from the remodel box. Still further, if the opening is significantly larger than the box, a cover plate, which is typically used to cover the box and any wiring components housed therein, may not completely cover the entire opening, and thus reveal an unsightly opening next to the cover plate into the space behind the gypsum board.

Thus, it is clear that the installation procedure followed for installing a remodel box is different from the installation procedure followed for installing an electrical box in new construction. Known installation procedures for a remodel box typically include finding a location along the wall where the gypsum board is not backed by a stud or other structural member, placing a paper template over the gypsum board at the location where the boxes to be installed, then cutting the gypsum board along the locations indicated by the template, and then attaching the box to the gypsum board through the opening created with the template. This method, however, is difficult to carry out without damaging the gypsum board or producing an installation that is correctly positioned, with the side edges of the box being in a straight vertical orientation.

Many of the problems associated with improper positioning of the box stem from the difficulties associated with the use of a paper template to mark the outline of the location to be cut from the gypsum board to install the box. More specifically, the paper tends to give way when contacted with a marker or pencil. Additionally, the orientation of the paper template is typically established by drawing a straight line with the use of a level, and then this straight line is used to align the paper template at the proper distance from the floor. Template is then used to mark location of the box on the wall. As discussed above, the paper template tends to give way and result in an uneven, non-parallel opening for the box.

It is important to create a straight, even opening in the gypsum board for the support of a remodel box. This is because a remodel box cooperates with the opening in the gypsum board in order to provide the needed support for the remodel box and establish the orientation of the remodel box.

Thus, it will be understood that devices used for positioning electrical box during construction are of little use in remodeling applications, where studs or other structural members of the building are not available for indexing or support.

Still further, while devices that are used for aligning, or positioning, electrical box which has been attached to a structural member are also of little assistance in remodeling applications. For example, a known device for leveling outlet boxes is shown in U.S. Pat. No. D298,421 to Tyroff. The Tyroff device includes a pair of spirit levels positioned at right angles to one another, and further includes a pair of spaced apart plates with edges, indicia notches, and a pair of raised grommets with apertures which appeared to be positioned for engagement with an outlet box's fastener holes. The Tyroff device appears well suited for use as an alignment tool that attaches to an electrical box that mounts on a stud or other structural component that is hidden behind the gypsum board. Thus, the Tyroff device allows the use of fasteners that will extend though the device and engage the box to allow the user to then fasten the box at a desired position against the support structure. The multi-layered construction of the Tyroff device allows support of the template at a desired position in relative to a these support structure, so that the electrical box is held at the desired position by the template. Thus, will be appreciated that the essential components of the Tyroff device include the fastener holes and the spirit levels which are used to position the electrical box by means of the template.

Is important to note that modification of the Tyroff device to eliminate the grommets and holes would render the Tyroff invention unsatisfactory for its intended purpose. This is because elimination of the grommets and holes would render the Tyroff device incapable of supporting an electrical box. The function of supporting the electrical box prior to fastening of the electrical box against the support structure is a highly desired function which must be carried out in some manner by the Tyroff type of device, since appropriate positioning of the box may only be accomplished by establishing some sort of connection between the spirit levels and the box itself.

Thus, it is important to note that the principle of operation of the Tyroff device is the attachment spirit level to the electrical box and then fastening electrical box to support structure while monitoring the vertical orientation of the box with this third level that has been attached to the box. In other words, modification of the Tyroff device to eliminate the attachment of the device to the box prior to attachment of the box to the support structure is likely to produce undesirable results in that the resulting device would be incapable of holding the box at the desired position while being fastened against the support structure.

Another known device, disclosed in U.S. Pat. No. 5,630,281 to Pledger et al., consists of a template for the mounting of an electrical service box during new construction. It is important note that, terminology used in the art as evidenced by the Pledger patent, the word "template" often includes a jig that is used to hold an electrical box, and not a "template" with a cutout pattern.

An examination of the teachings of known art reveals that there remains a need for a device that allows the user to mark and create an opening in a gypsum board wall to position and support a remodel box.

SUMMARY

It has been discovered that the problems left unanswered by known art can be solved by providing a tool or device for establishing and marking the position of the opening for the remodel box to installed, the tool or device includes:

a base having a perimeter defined by at least one pair of substantially parallel sides, an upper surface and a lower surface, the lower surface being substantially flat; and a level indicator that is substantially perpendicular to the substantially parallel sides.

According to a highly preferred embodiment of the invention the base is made from a generally rectangular single sheet of relatively thin material. Additionally, according to this highly preferred embodiment, the substantially parallel sides of the base will spaced apart from one another at a distance that represents the width between two substantially parallel sides of a remodel box.

It has also been discovered that it is advantageous to form the base from a translucent material, and in a highly preferred embodiment of the invention, the base is made from a transparent material that allows the user to clearly see the edge of the base as the user follows the parallel sides to mark or score the surface of the gypsum board to mark the location of the edge of the aperture to be formed for supporting the electrical box.

Additionally, it is advantageous to provide the base with a pair of edges that are positioned next to the parallel edges, and at diagonally opposed locations on the base. These edges will allow the user to mark and create an aperture that will provide a large area for support of the electrical box by producing an opening with an outline that is can cooperate with nearly the entire length of the legs of the remodel box.

It should also be understood that while the above and other advantages and new, useful results of the present invention will become apparent to those skilled in the art from the following detailed description and accompanying drawings, showing the contemplated novel construction, combinations and elements as herein described, and more particularly defined by the appended claims, it is understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which:

FIG. 3 is a perspective view of a highly preferred embodiment of the invention.

FIG. 4 is a top, plan view of the embodiment illustrated in FIG. 3.

FIG. 5 is a side elevational view of the embodiment illustrated in FIG. 4.

FIG. 6 is a top, plan view of a variation of the invention, the variation being a body adapted for a two gang remodel box.

FIG. 7 is a top, plan view of a variation of the invention.

FIG. 8 is a variation of the embodiment shown on FIG. 7.

DETAILED DESCRIPTION OF PREFERRED EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Figure 1:
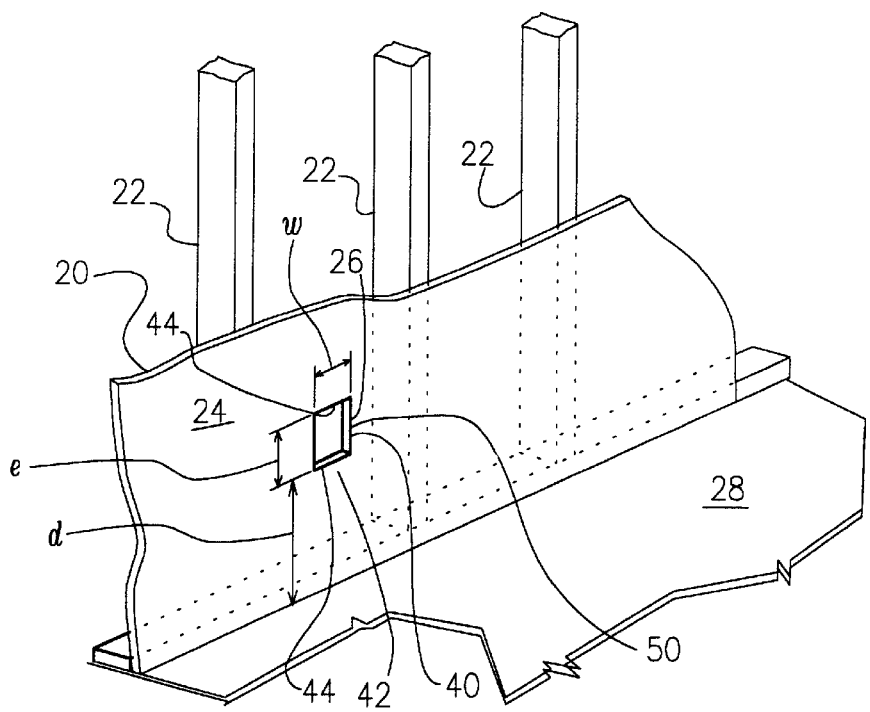
FIG. 1 is a perspective view illustrating the desired positioning of an aperture for a remodel box, the aperture being between studs.

Turning now to FIG. 1 where a section of gypsum board 20 is shown supported on several studs 22 to form a wall 24. Along the wall 24 is shown an aperture 26 for accepting a remodel electrical box, or as will be referred to herein a remodel box. FIG. 1 illustrates that the aperture 26 for the remodel box will be placed at a desired distance "d" from the floor 28, and between studs 22.

Figure 2:
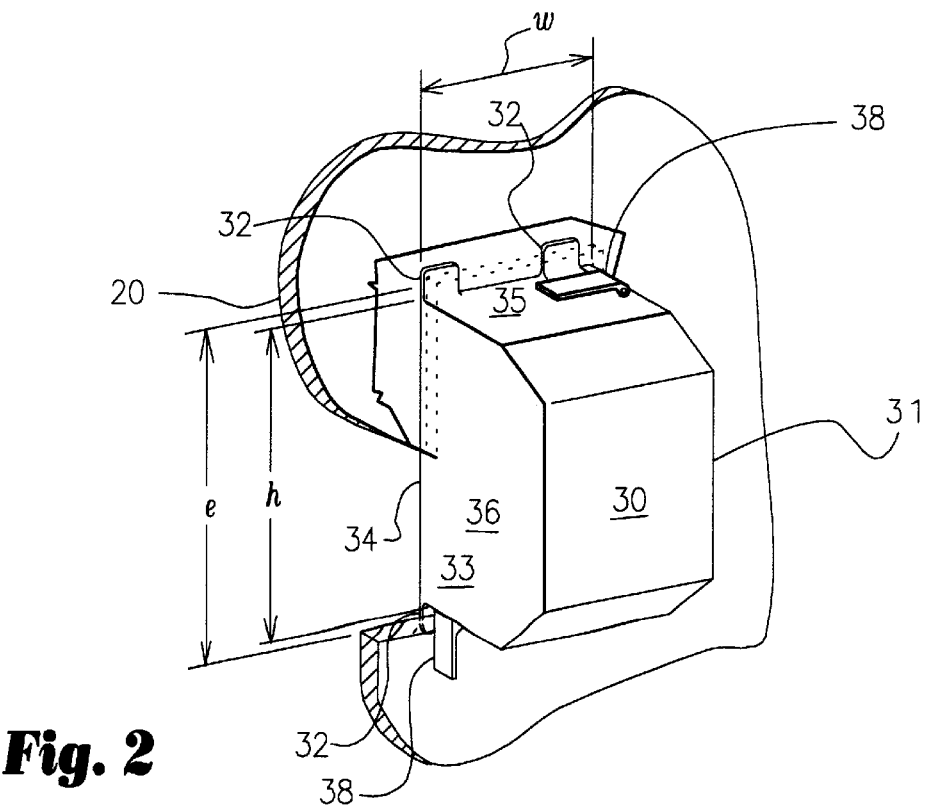
FIG. 2 is a perspective view of a remodel box with one leg extended to capture the gypsum board between the leg and the fixed tab of the remodel box, and one leg folded for insertion or removal of the remodel box from the aperture in the gypsum board.

Turning now to FIG. 2, where a remodel box 30 has been shown mounted through the wall 24. The remodel box 30 includes a body 31 with a perimeter 34 and fixed tabs 32 that extend from the perimeter 34 of the remodel box 30. The perimeter of the remodel box 30 is defined by a pair of endwalls 35 which are generally parallel and spaced apart from one another at a distance "h", and a pair of generally parallel sidewalls 33 spaced apart from one another at a distance "w", defining the generally rectangular portion of the external surface 36 of the body 31 of the remodel box 30. The remodel box 30 is used to hold one or more gangs of switches, plug-in sockets or the like, much like the well known electrical box.

As can be understood from FIG. 2, the remodel box 30 is supported by the gypsum board 20 by means of the support provided by a set of pivotally mounted legs 38 when they capture the end areas 42 of the aperture 26 between the legs 38 and the fixed tabs 32, and the vertical sides 40 of the aperture 26, as the vertical sides 40 bear against the sidewalls 33 of the remodel box 30. Thus, it will be understood that the adequacy or firmness of the support provided by the gypsum board 20 depends on the amount of end area 42 captured between the tabs 32 and the legs 38 and by the cooperation of the vertical sides 40 of the aperture 26 and the sidewalls 33 of the box 30. Therefore, to create a strong support for the remodel box 30, it is important to create a rectangular aperture 26 which includes straight vertical sides that bear against the sidewalls 33. To create such an opening it is important to use a method that creates vertical sides 40 that are parallel to one another and spaced at a width "w", the width of the body 31 of the remodel box 30. Additionally, it is also important to achieve a rectangular aperture 26 in which the end edges 44 are spaced apart at a distance "e" that is slightly larger than the height "h" of the body 31 of the box 30. By ensuring that "e" is only slightly larger than "h" one ensures that the support for the remodel box is maximized. Preferably, "e" will be only approximately one inch larger than "h".

Turning now to FIG. 3, where a highly preferred embodiment of a template tool 46 which serves for marking a location 48, for the external edges 50 of the vertical sides 40 and the of the aperture 26 in the gypsum board 20. The aperture in the gypsum board 20 is to be used to support the remodel box 30 as discussed above. Thus, the edges 50 will allow forming of the aperture 26 for the remodel box 30, so that the aperture 26 will include a pair of generally parallel vertical sides 40 spaced apart from one another at the distance w, which corresponds to the distance between the sidewalls 33 of the remodel box 30.

To create the edges 50 and vertical sides 40, a highly preferred embodiment of the invention includes a remodel box installation tool 51, illustrated in FIGS. 3 through 6, which includes a base 52 with a perimeter 54. The perimeter 54 is preferably defined by at least one pair of substantially parallel sides 56, which spaced from one another at the distance "w", corresponding to the distance between the sidewalls 33 of the remodel box 30 to be installed. It is important to note that it is contemplated that the distance between the parallel sides 56 may be varied to allow for the width of the blade of a cutting tool to be used to create the aperture 26 and to allow for the thickness of a writing or marking instrument to be used in locating the edges 50.

The base 52 will also include a pair of generally parallel end sides 62 which are spaced apart at a distance "h", measured along a line that is substantially normal to the parallel end sides 62. It is important to note that it is contemplated that the end sides 62 do not have to be straight between the two parallel sides 56, but need to be generally straight on opposing diagonal corners as shown on FIGS. 3 through 6. The preferred embodiment of the invention, however, includes straight end sides 62.

Additionally, as illustrated in FIGS. 3 through 6, the base 50 will include an upper surface 58 and a lower surface 60, the lower surface being substantially flat, so that the base may rest directly against the surface of the gypsum board, preventing the distortions or errors introduced by, say, the raising or lifting of the parallel sides of the base while marking the location of the edges 50 on the gypsum board 20. Also illustrated on FIGS. 3 through 6 is that it is contemplated that the upper surface of the base 58 will include raised markers 70 to allow users to identify the center point along the parallel sides 56 or the end sides 62. It is also contemplated that instructional indicia 72, indicating that the gypsum board should be made on the inside edge of the line marked with the tool 46 will also be incorporated into the upper surface 58 of the base 52.

Attached to the upper surface 58 of the base 52 is an elongated level indicator 64 which is mounted through support means 65 between the substantially parallel sides 56 and at a substantially perpendicular orientation to the substantially parallel sides 56. It is contemplated that the support means 65 may include glue or mechanical support devices. Additionally, it is contemplated that the elongated level indicator 64 will be a vial containing a liquid with a bubble to allow the user to determine when the vial is at a substantially horizontal position. It is also important to note that while it is contemplated that a vial with a bubble may be used as the level indicator, it is also contemplated that a variety of other electronic or mechanical devices could be mounted on the upper surface of the base to serve the function of level indicator 64. Once the level indicator has been used to ensure that the substantially parallel sides 56 are vertically aligned, the perimeter of the base 54 will then be used to mark or score the surface of the gypsum board 20 to mark the location of the edge 44 and 50 of the aperture to be formed for supporting the electrical remodel box 30.

It is also important to note that, as shown on FIGS. 3 through 8, the template tool 46 will preferably be made from a thin, single sheet of translucent, and most preferably transparent, material having a rectangular shape, whether as an external perimeter, as shown on the highly preferred embodiment illustrated in FIGS. 3 though 6.

An important variation to the highly preferred embodiment illustrated in FIGS. 3 through 6 has been illustrated as the template tool 46A in FIGS. 7 and 8, where the parallel sides 56A and end sides 62A are incorporated to an aperture 66 through the base 52A, which is also preferably of unitary, one piece construction of a thin section of transparent material. The embodiment shown on FIGS. 7 and 8 also includes end sides 62A at diagonally opposed corners of the aperture 66. It will be understood that the embodiment shown on FIGS. 7 and 8 provides important new and useful advantages in that it allows the user to test the fit of the remodel box through the aperture 66 before marking and cutting the gypsum board. This testing will allow the user to ensure that the proper fit will be achieved if the question arises due to variations in the remodel boxes of different manufacturers.

Thus, in view of the above it will be understood that the disclosed invention also discloses a novel method for installing a remodel box in existing construction. The method including Thus it can be appreciated that the above described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood by that the foregoing and other modifications are exemplary only, and that equivalent changes in form and detail may be made without departing from the true spirit and scope of the invention as claimed, except as precluded by the prior art.

What is claimed is:

1. A template tool for marking a location for the support of a remodel box next to corners or features protruding from a planar surface defined by a sheet of gypsum board, the remodel box having a pair of generally parallel sides spaced apart from one another at a distance "w", the location being on a section of gypsum board, the template tool comprising:
a solid, rectangular planar base having a generally flat upper surface and a generally flat lower surface, the base terminating in a generally rectangular perimeter bounded by at least one pair of substantially parallel sides spaced at the distance "w", an upper surface and a lower surface, the lower surface being substantially flat; and an elongated level indicator, the elongated level indicator having a cylindrical body having a longitudinal axis and a generally rounded perimeter cross-section normal to the longitudinal axis, elongated level indicator being mounted against the upper surface of the base in a manner that allows substantially all of the rounded perimeter cross-section of the elongated level indicator to protrude over the flat upper surface of the base, the elongated level indicator being mounted on the upper surface of the base in a substantially perpendicular orientation to the substantially parallel sides, so that the entire tool is bounded by the perimeter, and so that the elongated level indicator serves as a gripping handle to support the template tool immediately next to corners or features protruding from the planar surface defined by the sheet of gypsum board while a user marks or scores the surface of the gypsum board to mark the location of the edge of the aperture to be formed for supporting the electrical box.

2. A template tool according to claim 1 wherein said base is made from a thin, single sheet of material having a rectangular shape.

3. A template tool according to claim 1 wherein said base is made of a translucent material, so that the location to be marked is not obscured by the placement of the base.

4. A template tool according to claim 1 wherein said base is made from a transparent material, so that the bas e does not prevent the user from seeing the edge of the base as the user follows the parallel sides to mark or score the surface of the gypsum board to mark the location of the edge of the aperture to be formed for supporting the electrical box.

5. A template tool according to claim 4 wherein said base includes a pair of edges that are positioned next to the parallel edges, and at diagonally opposed locations on the base.

6. A template tool for marking the location of a remodel box next to corners or features protruding from a planar surface defined by a sheet of gypsum board, the remodel box having a rectangular body having a perimeter having a width "w" and a height "h", the remodel box to be supported from on a section of gypsum board, the template tool comprising:
a solid, rectangular planar base having a generally flat upper surface and a generally flat lower surface, the base having a generally rectangular external perimeter that surrounds the entire template tool, the perimeter bounded by at least one pair of substantially parallel sides spaced apart form one another the distance "w" and a pair of generally parallel ends that are normal to the parallel sides, the ends being spaced apart from one another the distance "h", the sides and ends being adapted for marking the cutout corresponding to the perimeter of the remodel box; and
an elongated, transparent level indicator, the elongated level indicator having a cylindrical body having a longitudinal axis and a generally rounded perimeter cross-section normal to the longitudinal axis, elongated level indicator being mounted against the upper surface of the base in a manner that allows substantially all of the rounded perimeter cross-section of the elongated level indicator to protrude over the flat upper surface of the base, the elongated level indicator being mounted in a substantially perpendicular manner between the substantially parallel sides to mark or score the surface of the gypsum board to mark the location of the edge of the aperture to be formed for supporting the electrical box.

7. A template tool according to claim 6 wherein said base is of a constant thickness.

8. A method for installing and supporting an electrical remodel box next to corners or features protruding from a planar surface defined by a section of gypsum board, the remodel box having a rectangular perimeter having a pair of substantially parallel sides spaced apart at a distance "w" and a pair of sides spaced apart at a distance "h", the method comprising:
providing a template tool for marking the location of placement of the remodel box on the section of gypsum board, the template tool comprising:
a base having a generally rectangular external perimeter that surrounds the entire template tool, the perimeter corresponding with the perimeter of the remodel box, the perimeter of the base being defined by at least one pair of substantially parallel sides, an elongated level indicator extending between the substantially parallel sides, the elongated level indicator having a cylindrical body having a longitudinal axis and a generally rounded perimeter cross-section normal to the longitudinal axis, elongated level indicator being mounted against the upper surface of the base in a manner that allows substantially all of the rounded perimeter cross-section of the elongated level indicator to protrude over the flat upper surface of the base, the elongated level indicator being substantially parallel end sides between the substantially parallel sides, an upper surface and a flat lower surface, the lower surface being substantially flat;
locating an area on the gypsum board which immediately next to corners or features protruding from the planar surface defined by the sheet of gypsum board that is unsupported by a stud;
placing the template tool over the unsupported area and vertically aligning the substantially parallel sides of the template tool by means of the level indicating means;
supporting the template tool by grasping the elongated level indicator while marking the surface of the gypsum board with lines along the substantially parallel sides of the template tool and along the end sides of the base;

cutting through the gypsum board along the markings to create an aperture with edges the edges, the aperture serving for supporting the electrical box; and inserting the electrical box through the aperture in the gypsum board.

9. A method according to claim 8 wherein said base is made from a single sheet of relatively thin material.

10. A method according to claim 8 wherein said substantially parallel sides are spaced apart from one another at a distance of approximately "w".

11. A method according to claim 8 wherein said base is made from a translucent material.

12. A method according to claim 8 wherein said base is made from a transparent material.

13. A method according to claim 8 wherein the step of marking is carried out by scoring the gypsum board by following the substantially parallel sides with a cutting tool.

14. A method to claim 13 wherein the step of cutting through the gypsum board is carried out with the same tool used for scoring.

* * * * *